June 9, 1953 A. BAKANE 2,641,516
COMBINED ROLLER AND BALL BEARING
Filed June 8, 1951 3 Sheets-Sheet 1

INVENTOR.
Anthony Bakane
BY Chas. Senegre
Attorney.

June 9, 1953 A. BAKANE 2,641,516
COMBINED ROLLER AND BALL BEARING
Filed June 8, 1951 3 Sheets-Sheet 2
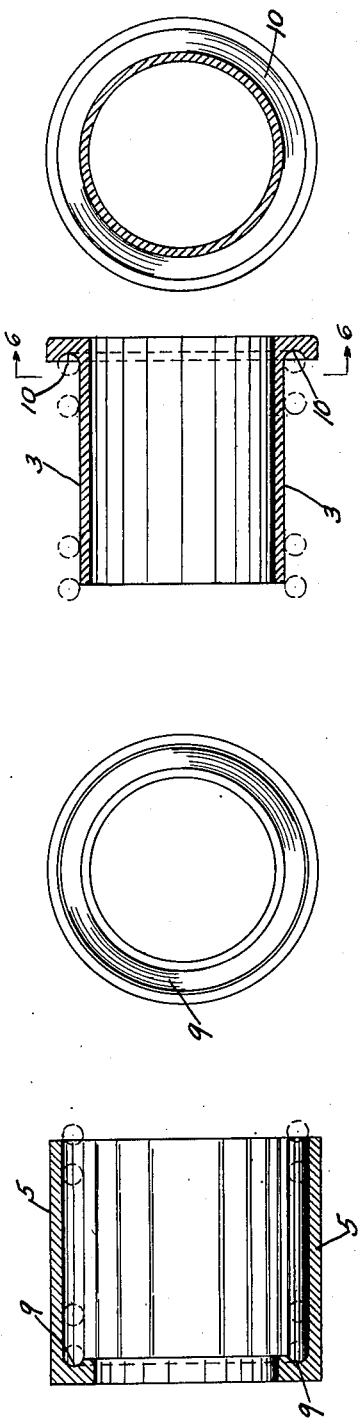
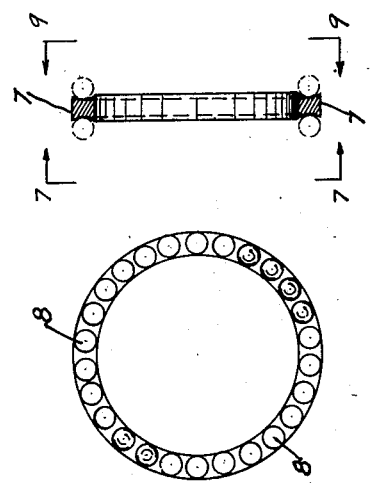
INVENTOR:
Anthony Bakane
BY Chas. Denegre
Attorney.

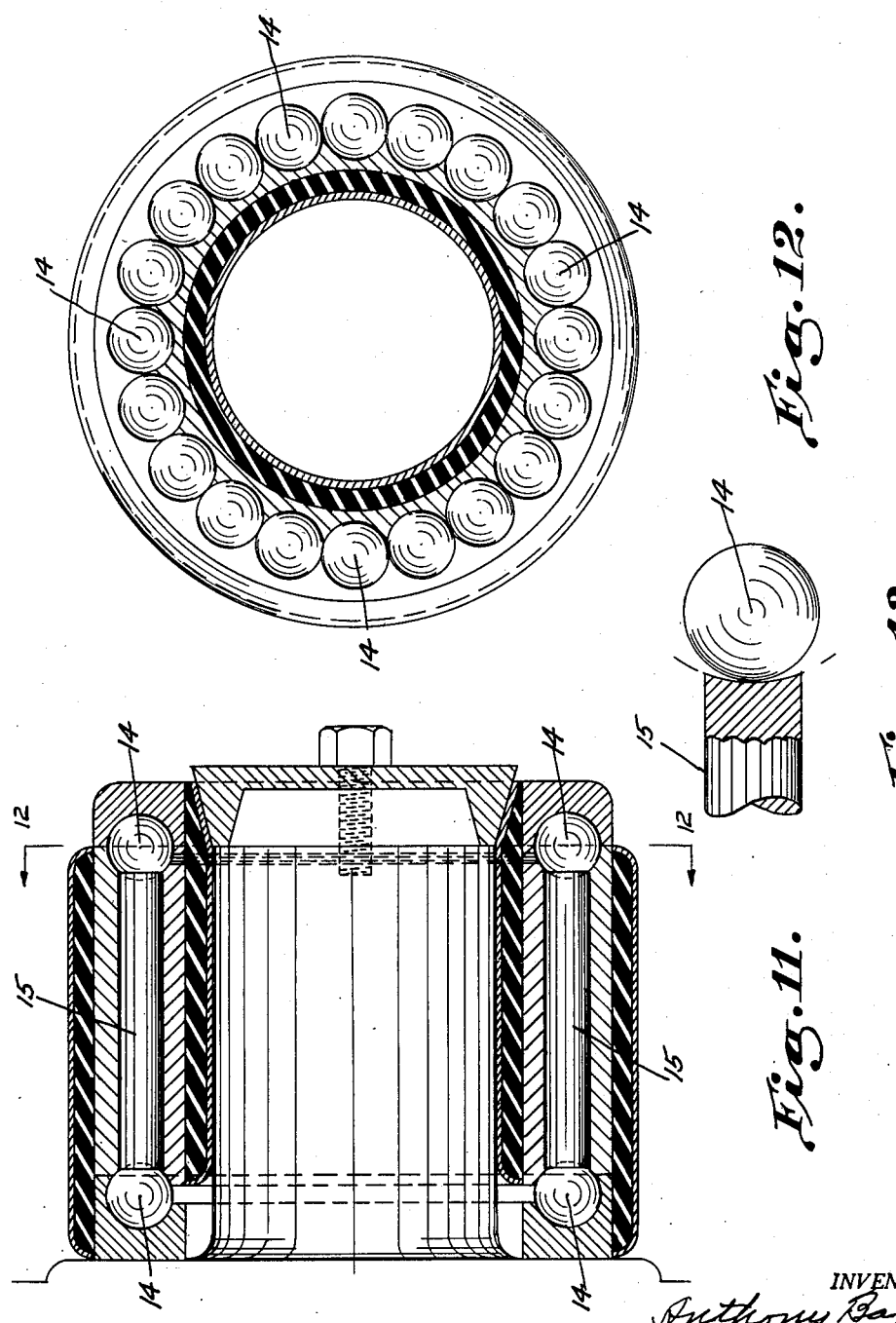

UNITED STATES PATENT OFFICE 2,641,516

COMBINED ROLLER AND BALL BEARING

Anthony Bakane, Birmingham, Ala.

Application June 8, 1951, Serial No. 230,581

1 Claim. (Cl. 308—174)

This invention relates to a combined roller and ball bearing. It has for its main object to provide such a bearing that will be highly efficient for heavy duty work on railway locomotives and cars, mining machinery, trucks and any other place where first class bearings are required. Further objects are to provide such a bearing that will eliminate almost all friction and be free from overheating.

Other objects and advantages will appear from the drawings and description.

Figure 2:
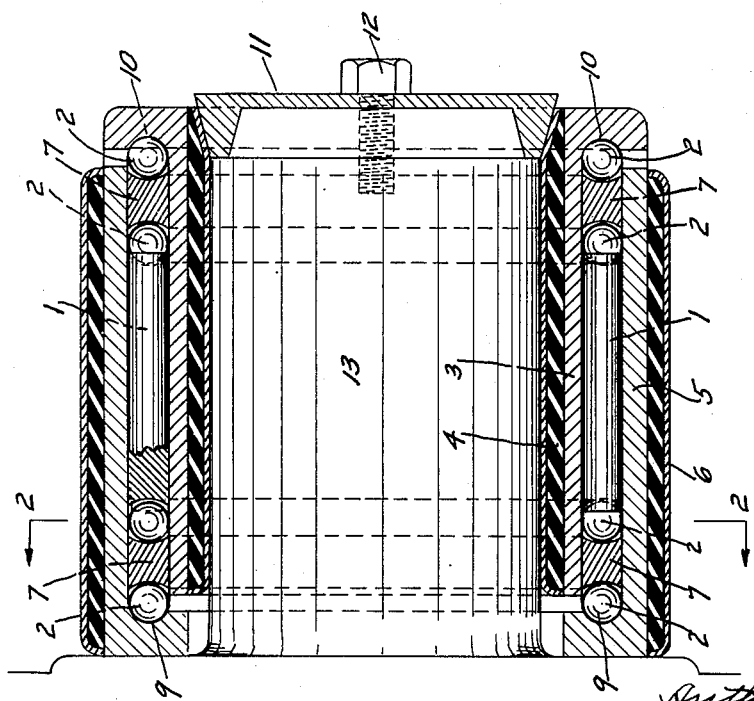
Figure 1:
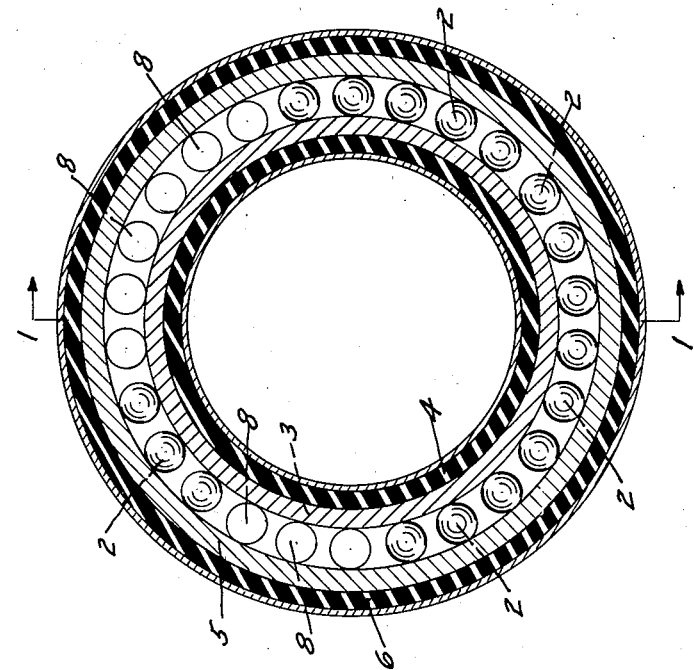

By referring generally to the drawings, a part of this application, it will be observed that Fig. 1 is a sectional view on line 1—1 of Fig. 2 showing an assembled bearing according to the present invention, mounted upon the end of a shaft; Fig. 2 is a sectional view on line 2—2 of Fig. 1; Fig. 3 is a sectional view showing the outer housing of the bearing; Fig. 4 is an end view of Fig. 3 assuming same to be a full view; Fig. 5 is a sectional view of the inner housing; Fig. 6 is a sectional view on line 6—6 of Fig. 5 assuming same to be a full view; Fig. 7 is a view on line 7—7 of Fig. 8 assuming Fig. 8 to be a full view; Fig. 8 is a sectional view of a separating ring of the bearing with balls indicated in broken lines; Fig. 9 is a view on line 9—9 of Fig. 8 assuming Fig. 8 to be a full view less the balls. Fig. 10 is an enlarged fragmentary view showing part of a separating ring with balls indicated in broken lines. Fig. 11 is a sectional view of a modified form of the bearing with the separating rings omitted; Fig. 12 is a sectional view on line 12—12 of Fig. 11; and Fig. 13 is a detail fragmentary view showing an end of a roller and ball.

Similar reference numerals refer to similar parts throughout the several views.

Referring to the assembled bearing in detail it will be seen that it comprises a plurality of rollers 1 and balls 2 mounted between an inner housing 3 that fits around a shock absorbing element 4, such as hard rubber or the like, that surrounds the shaft end, and an outer housing 5 with a shock absorbing element 6 surrounding it. In the type shown plainly in Figs. 1 and 2 two separating rings 7 are used with circular pockets 8 to accommodate the balls. The inner end of the outer housing is provided with a groove 9 for the balls to travel around therein, and the outer end of the inner housing is also provided with a groove 10 for the balls to travel around therein. The assembled bearing is retained in place for use by a cap 11 attached by a cap bolt 12 that screws into the end of the shaft 13. Washers are used if necessary to provide proper adjustment of the cap so as not to bind the bearing assembly.

The modified bearing as plainly shown in Figs. 11 and 13 does not use the separating rings. The balls 14 thereof are larger in diameter than the diameter of the rollers 15, otherwise the structure is the same. In both types the balls and rollers travel around the shaft with the rollers supporting the shaft load and the balls accommodating the lateral thrusts.

From the foregoing it will appear that the assembled bearing is adapted for use in any place where a roller or ball bearing is required. With the rollers taking care of the heavy portion of a load and the balls taking care of lateral movement, there remains little friction with the result that heating is eliminated.

The bearings may be made of any material suitable for the purpose, but I prefer to use steel for the metal parts and hard rubber or leather for the shock absorbing parts. Also the bearings may be made in different sizes and capacities, depending on where and how to be used. The shock absorbing parts may be eliminated if not necessary where the bearings are used.

While I have shown and described the preferred embodiment of my invention, I do not wish to limit same to the exact and precise details of structure, but reserve the right to make all modifications and changes so long as they remain within the scope of the invention and the following claim.

Having described my invention, I claim:

A combined roller and ball bearing of the character described comprising, a plurality of identical metal rollers and a plurality of identical metal balls, an inner housing and an outer housing, two identical rings mounted within said housings, said rings having a plurality of identical cavities in one of their side faces, said cavities positioned close to each other, each of said housings having a circular groove in one end portion thereof, balls positioned and seated in between the said cavities in one face of each ring and the grooves in the housings, each end of said rollers having a cavity therein, a ball positioned between the end of each roller and a cavity in the face of the adjacent ring.

ANTHONY BAKANE.

References Cited in the file of this patent

UNITED STATES PATENTS

| Number | Name | Date |
|---|---|---|
| 425,932 | Cooke | Apr. 15, 1890 |
| 442,352 | Cooke | Dec. 9, 1890 |
| 582,521 | Dismukes | May 11, 1897 |
| 823,083 | Russell | June 12, 1906 |
| 1,939,444 | Geyer | Dec. 12, 1933 |
| 2,240,285 | Chamberlain | Apr. 29, 1941 |
| 2,336,579 | Venditty | Dec. 14, 1943 |